US011993967B2

(12) United States Patent
Scorcia et al.

(10) Patent No.: US 11,993,967 B2
(45) Date of Patent: May 28, 2024

(54) SLIDING DOOR ROLLERS

(71) Applicant: Amesbury Group, Inc., Edina, MN (US)

(72) Inventors: Valentino Scorcia, Acton (CA); Mary Beth Dallmann, Owatonna, MN (US); Douglas John Criddle, Sioux Falls, SD (US)

(73) Assignee: Amesbury Group, Inc., Edina, MN (US)

(*) Notice: Subject to any disclaimer, the term of this patent is extended or adjusted under 35 U.S.C. 154(b) by 0 days.

(21) Appl. No.: 18/072,847

(22) Filed: Dec. 1, 2022

(65) Prior Publication Data

US 2023/0175298 A1 Jun. 8, 2023

Related U.S. Application Data

(60) Provisional application No. 63/285,262, filed on Dec. 2, 2021.

(51) Int. Cl.
*E05D 15/06* (2006.01)

(52) U.S. Cl.
CPC .... *E05D 15/0665* (2013.01); *E05Y 2201/688* (2013.01); *E05Y 2600/14* (2013.01); *E05Y 2900/132* (2013.01)

(58) Field of Classification Search
CPC ............ E05D 15/0665; E05D 15/0669; E05D 15/0634; E05Y 2201/64; E05Y 2201/688; E05Y 2600/14; E05Y 2900/132
See application file for complete search history.

(56) References Cited

U.S. PATENT DOCUMENTS

| | | | | |
|---|---|---|---|---|
| 3,996,643 A * | 12/1976 | Steigerwald | E05D 15/0669 | 16/99 |
| 4,194,266 A * | 3/1980 | Natzel | E05D 15/0669 | 16/DIG. 34 |
| 4,262,451 A * | 4/1981 | Dallaire | E05D 15/0669 | 16/99 |
| 4,282,631 A * | 8/1981 | Uehara | E05D 15/0665 | 16/105 |
| 5,950,279 A * | 9/1999 | Chaput | A47H 1/08 | 16/105 |
| 6,021,547 A * | 2/2000 | Stagoll | E05D 15/0669 | 16/99 |
| 6,588,061 B2 * | 7/2003 | Becken | E05D 15/0669 | 16/105 |
| 6,845,849 B2 * | 1/2005 | Bass | B66B 13/303 | 187/334 |

(Continued)

FOREIGN PATENT DOCUMENTS

AU 2014208204 B2 2/2015

*Primary Examiner* — Tara Schimpf
*Assistant Examiner* — Matthew J Sullivan
(74) *Attorney, Agent, or Firm* — Merchant & Gould P.C.

(57) ABSTRACT

A sliding door roller for a sliding door includes a slide disposed within a housing and a truck assembly disposed within the slide. When the truck assembly is retracted within the slide, the truck assembly and the slide are at least partially engaged to as to restrict or prevent the truck assembly from dropping out of the housing and rotating within the housing. The truck assembly being disengaged from the slide via an adjustment fastener to move the truck assembly towards and extended position relative to the housing.

20 Claims, 8 Drawing Sheets

(56) References Cited

U.S. PATENT DOCUMENTS

| | | | | |
|---|---|---|---|---|
| 7,770,329 | B2 * | 8/2010 | Hutnik | E05D 15/0669 49/411 |
| 7,962,998 | B2 * | 6/2011 | Proctor | E05D 15/063 16/97 |
| 8,955,195 | B2 * | 2/2015 | Chang | E05D 15/0634 16/105 |
| 9,085,924 | B2 * | 7/2015 | Tidwell | E05D 15/0669 |
| 9,376,848 | B2 * | 6/2016 | Terno | E05D 15/0652 |
| 9,834,969 | B2 * | 12/2017 | Kreyenborg | E05D 15/0643 |
| 10,711,497 | B2 * | 7/2020 | Lang | E06B 3/46 |
| 10,738,521 | B2 * | 8/2020 | Hamilton | E05D 15/0634 |
| 10,760,314 | B1 * | 9/2020 | Stryffeler | E05D 15/0665 |
| 11,274,480 | B2 * | 3/2022 | Minter | E05D 15/0634 |
| 11,479,999 | B2 * | 10/2022 | Terno | E05F 5/003 |
| 2005/0012816 | A1 * | 1/2005 | Becken | E05D 15/0665 348/107 |
| 2023/0039186 | A1 * | 2/2023 | Hooke | E06B 7/16 |
| 2023/0193677 | A1 * | 6/2023 | Krebs | E05D 15/0669 16/99 |

* cited by examiner

SLIDING DOOR ROLLERS

CROSS-REFERENCE TO RELATED APPLICATIONS

This application claims priority to and the benefit of U.S. Provisional Application No. 63/285,262, filed Dec. 2, 2021, which is incorporated by reference in its entirety herein.

INTRODUCTION

Generally, sliding doors have a door panel that is supported within tracks in a head and/or still of a door frame by a roller assembly that enables the sliding door panel to slidingly open and close. The roller assembly can include a pair of rollers that are adjustable within a housing so as to define how far the rollers extend out from the housing. By retracting the rollers relative to the housing, the sliding door panel may be more easily installed. Once inserted into the door frame, the rollers can be extended so as to set the position of the sliding door panel within the tracks. However, the retracted position of the rollers within the housing is difficult to maintain during installation because the roller assembly is not supporting the weight of the sliding door panel. As such, even when the rollers are retracted within the roller assembly, the rollers are known to often undesirably move towards an extended position during installation and/or removal of the sliding door panel from the door frame.

SUMMARY

In an aspect, the technology relates to a sliding door roller including: a housing defining a longitudinal axis and a transverse axis, the longitudinal axis orthogonal to the transverse axis, the housing defining an opening oriented substantially along the transverse axis; a slide defining a transverse opening enlarged along a direction corresponding to the transverse axis and slidably disposed within the housing, the slide selectively moveable along the longitudinal axis, the slide having a first surface; a truck assembly disposed at least partially within the slide, the truck assembly including: at least one support plate having a second surface; at least one roller rotatably coupled to the at least one support plate; and a pin coupled to the housing and the slide at the transverse opening, wherein the truck assembly is selectively rotatable about the pin relative to the slide and selectively slidable within the transverse opening; and one or more detent dimples extending from the first surface or the second surface, wherein the truck assembly is moveable via the slide between at least a retracted position and an extended position with respect to the opening of the housing, and wherein in the retracted position, the truck assembly is retained via the one or more detent dimples such that the truck assembly is restricted from dropping out of the opening of the housing along the transverse axis.

In an example, in the retracted position, the truck assembly is retained via the one or more detent dimples such that the truck assembly is restricted from rotating about the pin. In another example, the one or more detent dimples includes a first dimple and a second dimple, the first dimple disposed on a first side of the transverse opening and the second dimple disposed on a second side of the transverse opening, the first and second sides defined with respect to the longitudinal axis. In still another example, the first and second dimples extend from the first surface. In yet another example, when the truck assembly is in the retracted position, the first and second dimples engage with an end of the at least one support plate positioned closest to the opening of the housing. In an example, when the truck assembly is in the retracted position, the first and second dimples engage with an end of the at least one support plate positioned farthest from the opening of the housing.

In another example, the one or more detent dimples are a single dimple aligned with the pin along a direction corresponding to the transverse axis. In still another example, the single dimple extends from the second surface, and when the truck assembly is in the retracted position, the single dimple engages with an end edge of the transverse opening. In yet another example, the single dimple extends from the first surface, and when the truck assembly is in the retracted position, the single dimple engages with an end of the at least one support plate positioned closest to the opening of the housing. In an example, the slide includes a pair of wing extensions, and when the truck assembly is in the retracted position, the pair of wing extensions engages with the truck assembly. In another example, the slide includes a protrusion having a first extension distance, the one or more detent dimples having a second extension distance, the first extension distance greater than the second extension distance.

In another aspect the technology relates to a sliding door roller including: a housing defining a longitudinal axis; a slide disposed within the housing and selectively slidable along the longitudinal axis, wherein the slide defines a transverse opening; an adjustment fastener coupled between the slide and the housing, the adjustment fastener configured to selectively move the slide along the longitudinal axis; and a truck assembly disposed at least partially within the slide and at least partially slidable and rotatable with respect to the slide, the truck assembly including: a pair of support plates; a pair of rollers rotatably coupled between the pair of support plates; and a pin slidably engaged with both the housing and the slide at the transverse opening, the pin defining a rotation axis for the truck assembly, wherein the truck assembly is moveable between at least a retracted position and an extended position with respect to the housing via the adjustment fastener and the slide, and wherein in the retracted position, the truck assembly is releasably engaged with the slide such that the truck assembly is restricted from dropping out of the housing and rotating therein.

In an example, a pair of dimples extends from an inner surface of the slide that engage with the truck assembly when in the retracted position. In another example, the pair of dimples are disposed on opposite sides of the transverse opening relative to the longitudinal axis. In still another example, a dimple extends from an outer surface of one or more of the pair of support plates that engages with an end of the transverse opening when the truck assembly is in the retracted position. In yet another example, a pair of dimples extends from an inner surface of the slide to engage with a curved top edge of the truck assembly when in the retracted position. In an example, a single dimple extends from the inner surface of the slide to engage with a straight bottom edge of the truck assembly when in the retracted position.

In another example, the slide includes a pair of opposing extensions configured to engage with axles of the truck assembly when in the retracted position. In still another example, a dimple extends from an inner surface of the slide that engages with the truck assembly when in the retracted position.

In another aspect, the technology relates to a sliding door roller including: a housing defining a longitudinal axis and a transverse axis, the longitudinal axis orthogonal to the transverse axis, the housing defining an opening oriented substantially along the transverse axis; a slide defining a transverse opening enlarged along a direction corresponding to the transverse axis and slidably disposed within the housing, the slide having a first surface; an adjustment fastener coupled between the slide and the housing, the adjustment fastener configured to selectively move the slide along the longitudinal axis; a truck assembly disposed within the slide, the truck assembly including: at least one support plate having a second surface; at least one roller rotatably coupled to the at least one support plate; and a pin coupled to the housing and the slide at the transverse opening, wherein the truck assembly is selectively rotatable about the pin relative to the slide and selectively slidable within the transverse opening; and one or more detent dimples extending from the first surface or the second surface, wherein the truck assembly is moveable via the slide between at least a retracted position and an extended position with respect to the opening of the housing, and wherein in the retracted position, the truck assembly is retained via the one or more detent dimples such that the truck assembly is restricted from dropping out of the opening of the housing along the transverse axis and is restricted from rotating about the pin.

BRIEF DESCRIPTION OF DRAWINGS

There are shown in the drawings, examples that are presently preferred, it being understood, however, that the technology is not limited to the precise arrangements and instrumentalities shown.

DETAILED DESCRIPTION

Sliding door rollers are mounted on a sliding door panel so that the sliding door panel can slide within a door frame. The sliding door roller has one or more rollers that slide along a track within the door frame in order to facilitate sliding operations. The rollers are adjustable within the sliding door roller so as to adjust how far the rollers extend at least partially out of a housing of the sliding door roller. During installation and/or removal of the sliding door panel from the door frame, the rollers are desired to be retracted within the housing. This roller position makes the installation/removal process more efficient. Once the sliding door panel is within the door frame, the rollers are extended so as to set the position of the sliding door panel. However, when the rollers are retracted within the housing, this retracted position is known to be difficult to maintain during the installation/removal process of the sliding door panel. As such, the sliding door rollers described herein include detent features that facilitate retaining the rollers within the housing when retracted. When the rollers are being extended, the detent features are able to be overcome so that the rollers can extend and the detent features do not interfere with normal operation of the sliding door rollers.

The sliding door rollers described herein include the housing, a slide, and a roller assembly that include the rollers. Movement of the slide sets the position of the roller assembly and the extension distance of the rollers. The detent features are formed between the slide and the roller assembly so as to retain the roller assembly with respect to the slide when the rollers are retracted. In some aspect, the detent features allow for the roller assembly to snap into and out of the retracted position so as to assist installers in determining the position of the rollers.

Figure 1:
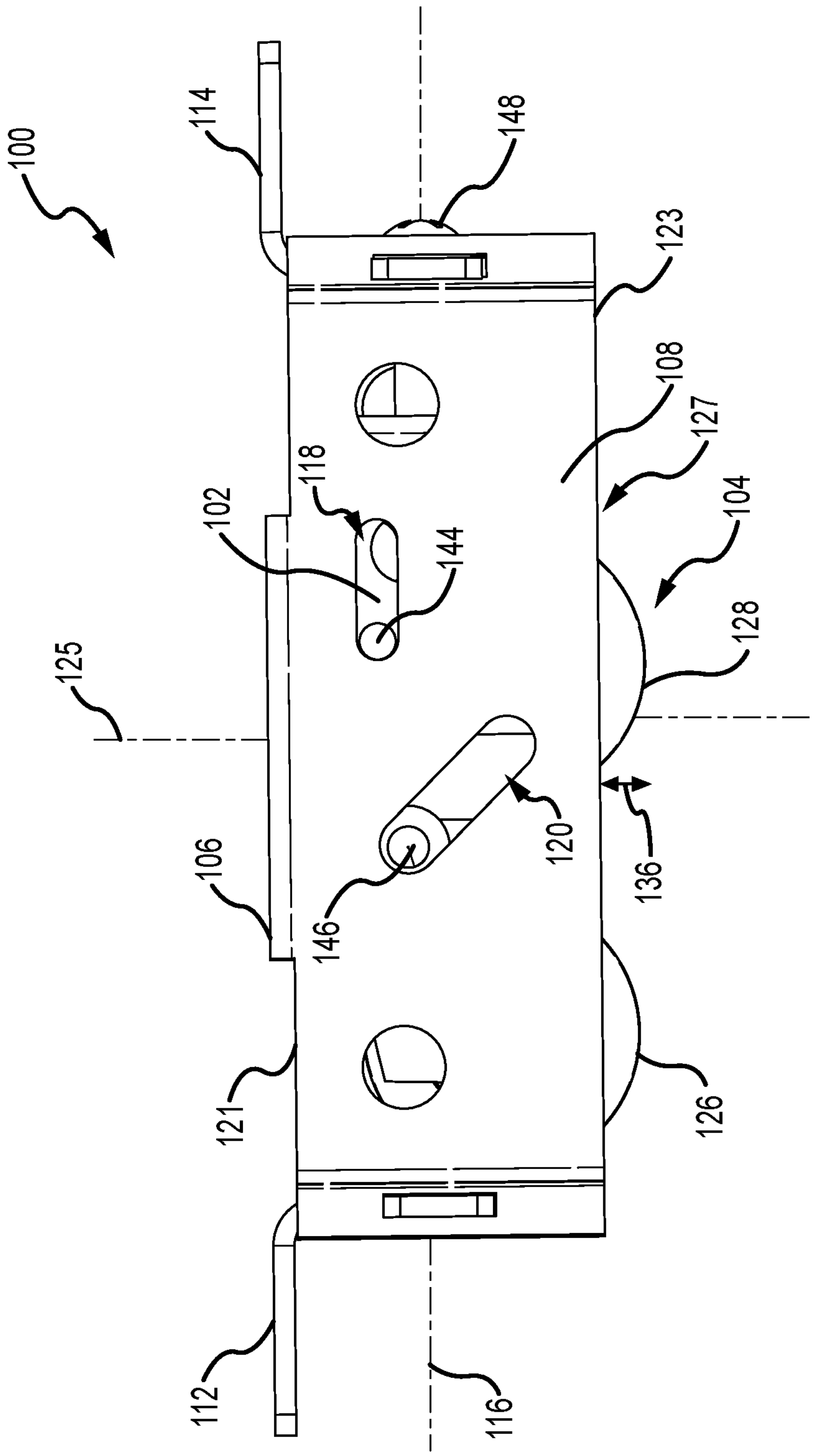
FIG. 1 is a side elevation view of an exemplary sliding door roller.
Figure 2:
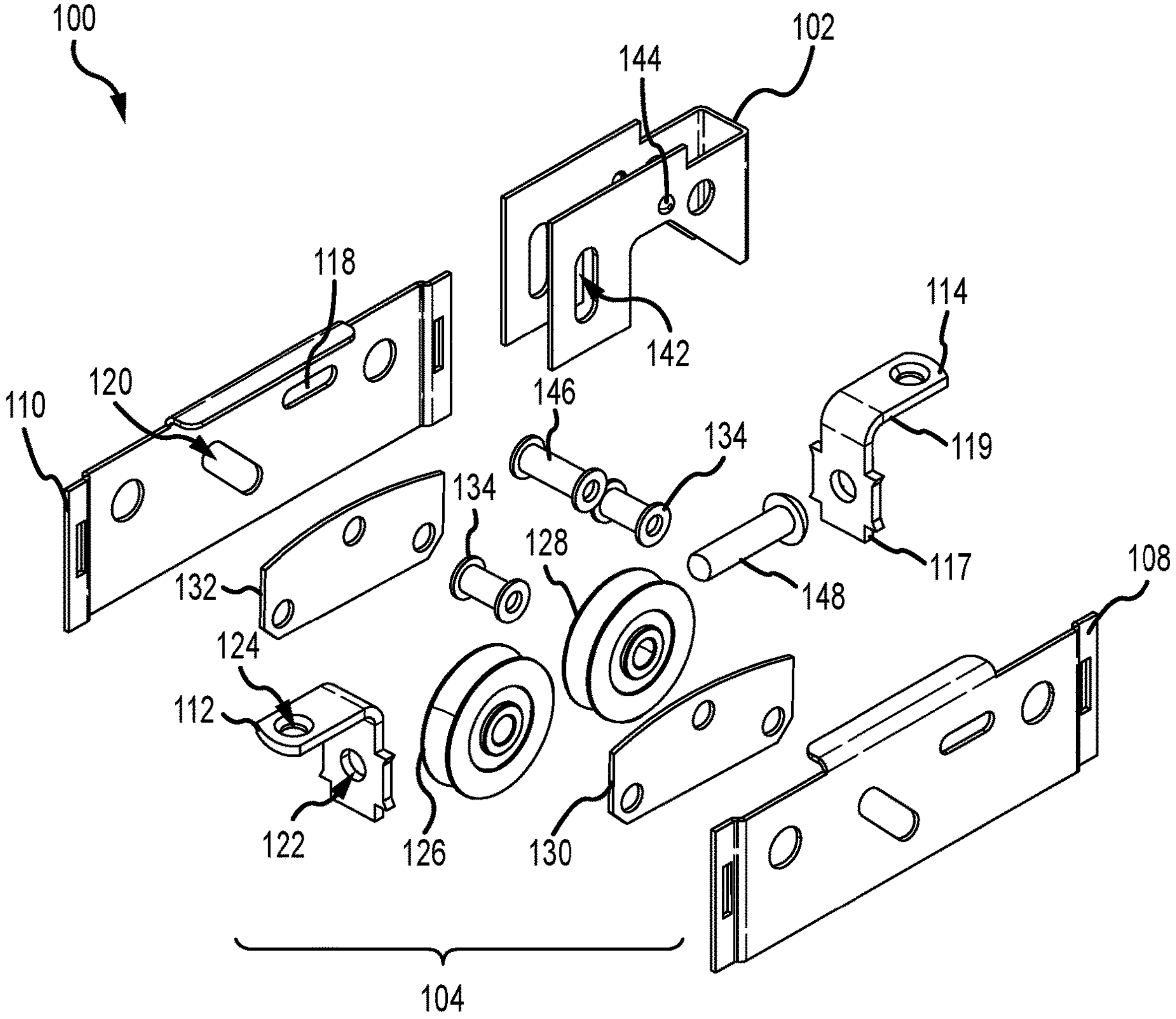
FIG. 2 is an exploded perspective view of the sliding door roller.
Figure 3:
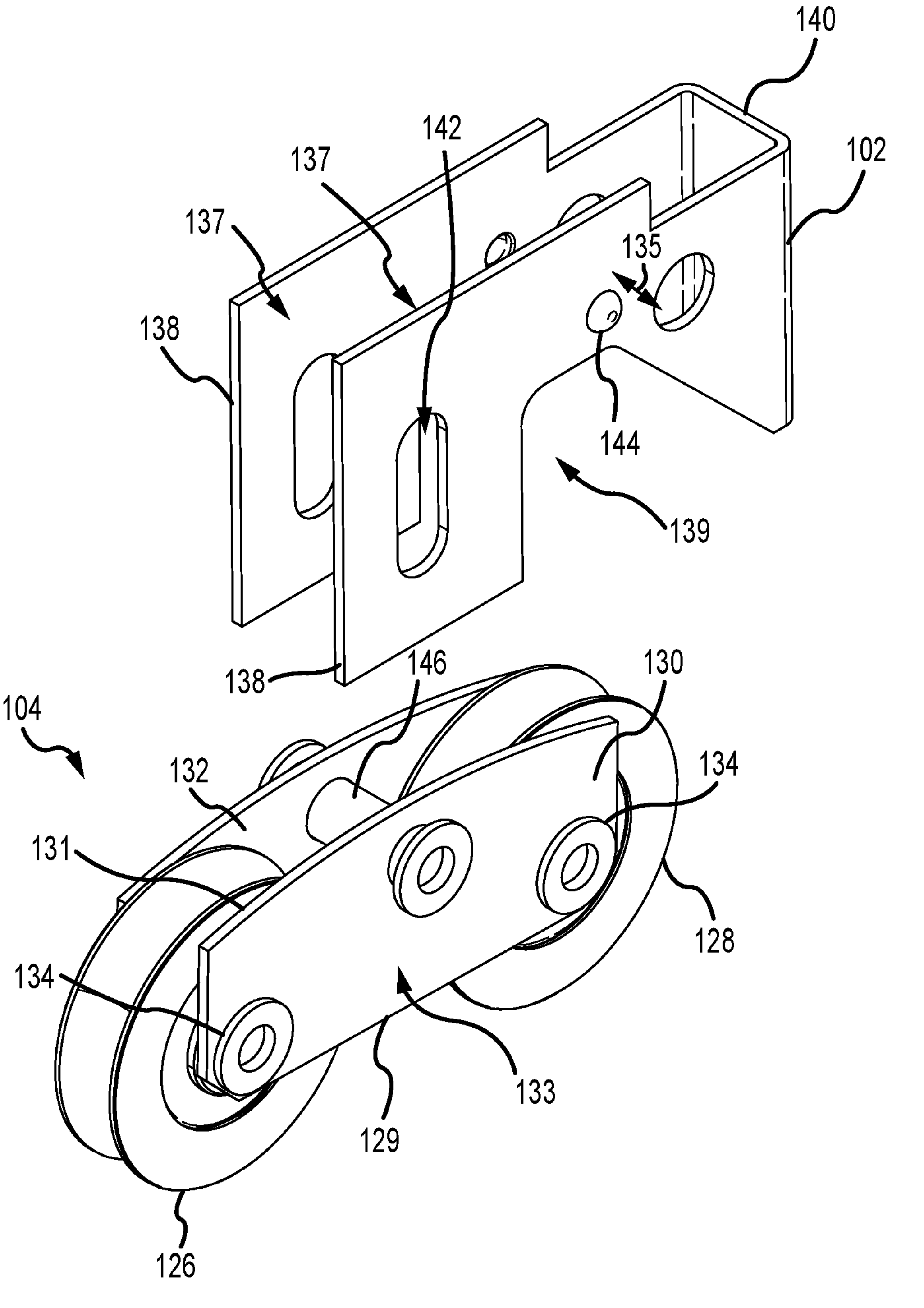
FIG. 3 is a perspective view of a slide and a truck assembly of the sliding door roller shown in FIGS. 1 and 2.

FIG. 1 is a side elevation view of an exemplary sliding door roller 100. FIG. 2 is an exploded perspective view of the sliding door roller 100. FIG. 3 is a perspective view of a slide 102 and a truck assembly 104 of the sliding door roller 100 (shown in FIGS. 1 and 2). Referring concurrently to FIGS. 1-3, the sliding door roller 100 includes the slide 102 and the truck assembly 104 supported at least partially within a housing 106. The housing 106 includes a pair of side plates 108, 110 and a pair of end brackets 112, 114. A longitudinal axis 116 extends through the end brackets 112, 114 and is parallel to the side plates 108, 110. A longitudinal opening 118 and an oblique opening 120 are defined within each side plate 108, 110. The end brackets 112, 114 are L-shaped with an adjuster opening 122 defined on a housing wall portion 117 and a fastener opening 124 defined on an extending leg 119. The extending leg 119 and the fastener opening 124 are used to secure the sliding door roller 100 to a sliding door panel (not shown). As illustrated, the extending leg 119 of the end brackets 112, 114 are positioned at a top 121 of the housing 106. In other examples, the extending leg 119 of the end brackets 112, 114 may be positioned at a bottom 123 of the housing 106. The sides of the housing wall portions 117 of the end brackets 112, 114 are configured to engage with the side plates 108, 110 in both the top and bottom configurations.

In the example, the top 121 and the bottom 123 of the housing 106 relate to the orientation of the sliding door roller 100 as illustrated in FIG. 1. This orientation is the installation position of the sliding door roller 100 as installed in a bottom rail of a sliding door panel, and thus, the truck assembly 104 is configured to slide along a bottom track of a door frame. It is appreciated that the sliding door roller 100 may have other installation positions on the sliding door panel and terms such as "top," "bottom," "vertical," etc. are not intended to be limiting. The top 121 and the bottom 123 of the housing 106 define a transverse axis 125 that is substantially orthogonal to the longitudinal axis 116. The bottom 123 of the housing 106 defines an opening 127 that is oriented substantially along the transverse axis 125 and which the truck assembly 104 extends at least partially out of the housing 106.

The truck assembly 104 includes a pair of rollers 126, 128 spaced apart along the longitudinal axis 116 and rotatably supported between a pair of support plates 130, 132 via axles 134. The rollers 126, 128 enable the sliding door roller 100 to roll along tracks in a header and/or a sill of a door frame (not shown) and allow the sliding door panel to slidingly open and close. The rollers 126, 128 are configured to extend out of the bottom opening 127 of the housing 106 so as to engage with the tracks of the door frame. In the example, the truck assembly 104 is configured to move relative to the housing 106 so that an extension distance 136 of the rollers 126, 128 out of the bottom 123 of the housing 106 is adjustable. The extension distance 136 is in a vertical direction of the sliding door roller 100 and is orthogonal to the longitudinal axis 116. In the example, the extension distance 136 is in a direction of the transverse axis 125.

Each support plate 130, 132 includes a first or bottom end 129 that is positioned closest to the opening 127 and closest to the bottom 123 of the housing 106. In the example, the bottom end 129 is substantially straight (e.g., planar, linear). An opposite second or top end 131 is positioned farthest from the opening 127 and closest to the top 121 of the housing 106. In the example, the top end 131 is substantially curved. Each support plate 130, 132 also has an outer surface 133 that is opposite from the position of the rollers 126, 128. The truck assembly 104 is configure to couple to the slide 102 and is disposed at least partially therein.

The slide 102 may be a U-shaped plate with side walls 138 and an end wall 140. A vertical or transverse opening 142 is defined within the side walls 138 and is elongated in the direction of the transverse axis 125. Additionally, a protrusion 144 extends outwards from the side walls 138. The protrusion 144 extends a distance 135 outwards from the side walls 138. In the example, the transverse opening 142 is spaced from the protrusion 144 along the longitudinal axis 116. The protrusion 144 may be positioned towards the top 121 of the housing 106. The side walls 138 have an inner surface 137 that faces one another. Each side wall 138 includes a cutout 139 disposed at least partially below the protrusion 144.

Turning back to the truck assembly 104, the truck assembly 104 includes a pin 146 that extends through the support plates 130, 132 proximate the top end 131. In an aspect, the pin 146 may be positioned at a midpoint between the rollers 126, 128. The pin 146 at least partially projects from the outer surface 133 of the support plates 130, 132 and is configured to be received within the transverse openings 142 of the slide 102. This coupling enables the truck assembly 104 to move relative to the slide 102 in the vertical direction and along the transverse axis 125. The pin 146 also defines a rotation axis for the truck assembly 104 so that the truck assembly 104 can pivot around the pin 146. For example, when the truck assembly 104 pivots, the roller 126 may extend further from the housing 106 than the roller 128, or the roller 128 may extend further from the housing 106 than the roller 126. This configuration facilitates keeping the rollers 126, 128 on the track when the sliding door panel slides.

The slide 102 is coupled to the housing 106 and disposed therein. The side walls 138 are disposed adjacent to the side plates 108, 110 and the end wall 140 is disposed adjacent to one of the end brackets 112, 114. The protrusion 144 is slidably received at least partially within the longitudinal opening 118 and the slide 102 is configured to selectively move along the longitudinal axis 116 within the housing 106. The truck assembly 104 is also engaged with the housing 106 and the pin 146 is slidably received at least partially within the oblique openings 120. Additionally, an adjustment fastener 148 (e.g., threated bolt) is coupled between the slide 102 and the housing 106. In the example, the adjustment fastener 148 extends through the adjuster opening 122 of one of the end brackets 112, 114 and engages with the end wall 140 of the slide 102. The adjustment fastener 148 is used to drive movement of the slide 102 along the longitudinal axis 116. For example, upon rotation of the adjustment fastener 148, the slide 102 is configured to move away from and towards the end bracket 114 within the housing 106 and along the longitudinal axis 116.

In operation, the pin 146 of the truck assembly 104 engaging with both the slide 102 at the transverse openings 142 and the housing 106 at the oblique openings 120 determines the extension distance 136 of the rollers 126, 128. As illustrated in FIG. 1, the truck assembly 104 is in its most retracted position within the housing 106. As such, the slide 102 and the truck assembly 104 are positioned towards the end bracket 112 and away from the end bracket 114. The pin 146 is positioned at the top of the oblique opening 120 and the protrusion 144 is on the left side of the longitudinal opening 118. In order to increase the extension distance 136 of the rollers 126, 128, a user may rotate the adjustment fastener 148 so as to pull the slide 102 towards the end bracket 114. This movement of the slide 102 along the longitudinal axis 116 results the in pin 146 sliding in the oblique opening 120 which results in the truck assembly 104 being moved downward and extending from the opening 127 of the housing 106 based on the oblique angle of the oblique opening 120. However, the slide 102 maintains its position along the transverse axis 125 within the housing 106 via the protrusion 144. In an aspect, the axle 134 of the roller 128 is disposed at least partially within the cutout 139, and the cutout 139 enables movement of the truck assembly 104 as described herein. The sliding door roller 100 may be considered an end adjust, tandem axle, sliding door roller.

During installation of the sliding door panel, the sliding door roller 100 is positioned in its retracted most configuration as illustrated in FIG. 1. This enables for the sliding door panel to be more easily installed within the tracks of the head and/or sill of a door frame and when compared to having the rollers 126, 128 extended or partially extended. However, even in the retracted most configuration, the weight of the truck assembly 104 may cause the truck assembly 104 drop out of the bottom 123 of the housing 106. That is, the truck assembly 104 moves toward an extended configuration without the use of the adjustment fastener 148. This drop of the truck assembly 104 is undesirable because it makes the installation of the sliding door panel more difficult.

Additionally, the truck assembly 104 is configured to at least partially rotate around the pin 146. This configuration enables both rollers 126, 128 to always be in contact with the tracks of the door frame. As such, when the truck assembly 104 is in its retracted most configuration, the truck assembly 104 may undesirably rotate around the pin 146 which extends one of the rollers 126, 128 out from the bottom of the housing 106 more than the other. This partial drop of the truck assembly 104 is also undesirable because it makes the installation of the sliding door panel more difficult.

Given the foregoing, the sliding door roller 100 described herein provides features that reduce or prevent the truck assembly 104 from dropping out of its retracted most position and/or rotating while in its retracted most position. Additionally, these features still allow for the sliding door roller 100 to be adjustable as described herein and once the sliding door panel is installed into the tracks in the head and/or sill of the door frame. As described below, the truck assembly 104 and the slide 102 at least partially engage while the truck assembly 104 is retracted therein so as to reduce or prevent dropping and/or rotating relative to the opening 127 of the housing 106. Furthermore, the truck assembly 104 and the slide 102 can be released from this engagement by use of the adjustment fastener 148 so that the extension distance 136 of the rollers 126, 128 can be set as described herein.

Figure 4:
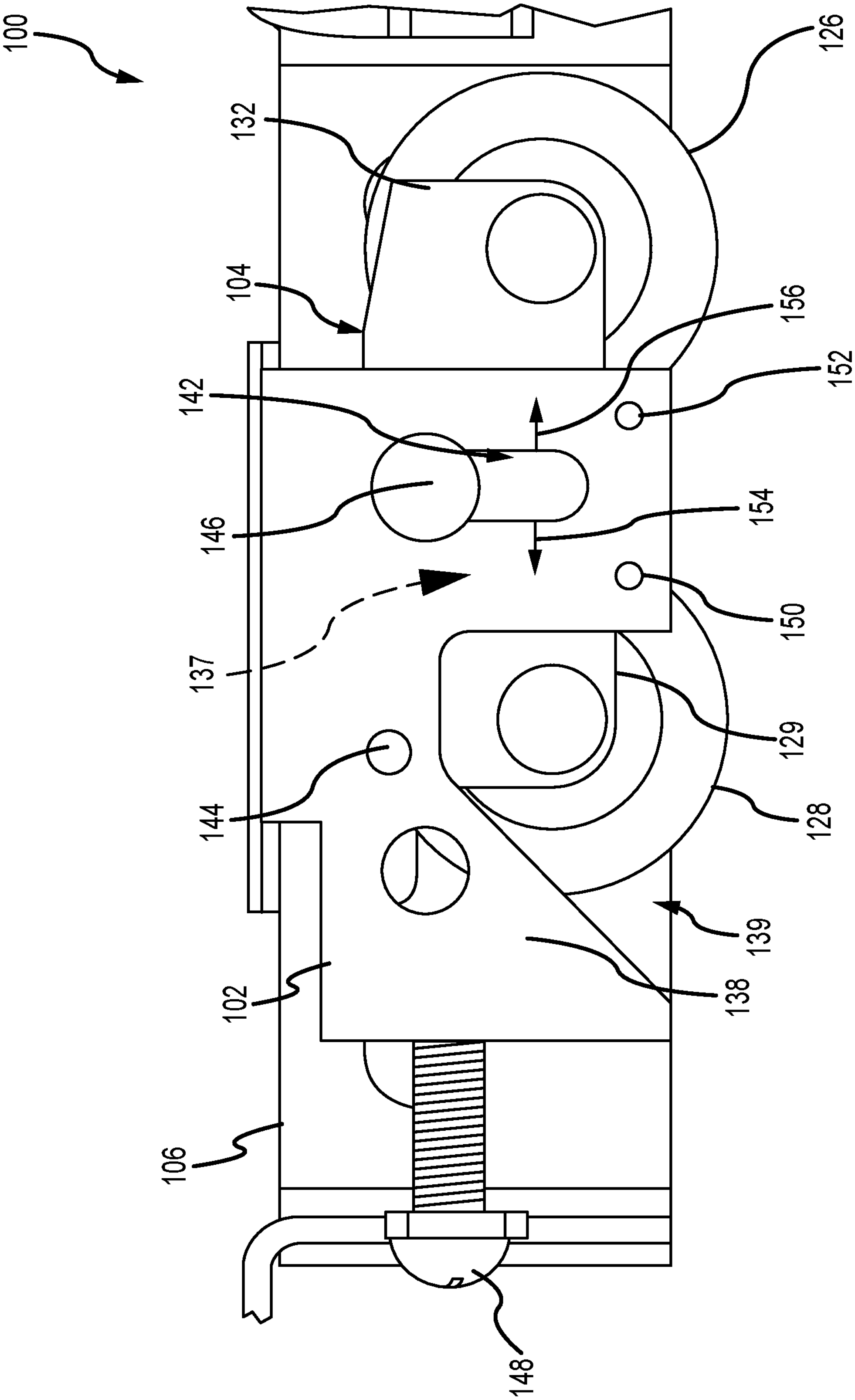
FIG. 4 is a side interior view of the sliding door roller with the slide and truck assembly of FIG. 3 that reduces or prevents drop and rotation of the truck assembly.
Figure 5:
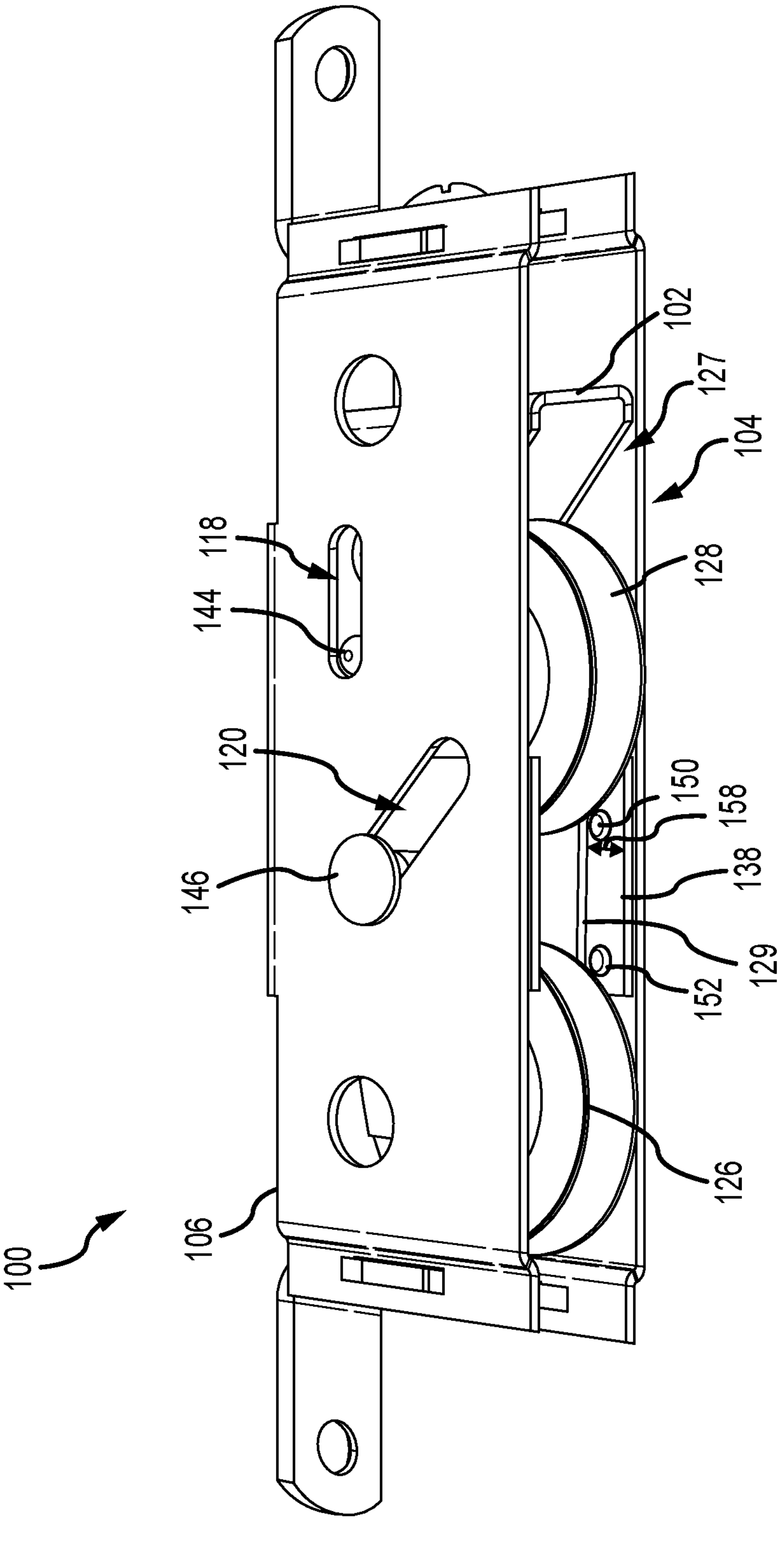
FIG. 5 is bottom perspective view of the sliding door roller shown in FIG. 4.

FIG. 4 is a side interior view of the sliding door roller 100 with the slide 102 and truck assembly 104 configuration that reduces or prevents drop and rotation of the truck assembly 104. FIG. 5 is bottom perspective view of the sliding door roller 100 with the slide 102. Referring concurrently to FIGS. 4 and 5, certain components are described above and are not necessarily described further below. In the example, the slide 102 includes a pair of detent dimples 150, 152 disposed on one or both of the side walls 138. The dimples 150, 152 are configured to retain the truck assembly 104 in the retracted position and so as to restrict or prevent the truck assembly 104 from dropping out of the opening 127 of the housing 106 along the transverse axis 125 (shown in FIG. 1). The dimples 150, 152 are disposed on the inner surface 137 of the side wall 138 and are configured to engage with the bottom end 129 of the support plate (e.g., one or both of the support plates 130, 132) of the truck assembly 104, when the truck assembly 104 is in its most retracted position and as illustrated. In an example, the dimples 150, 152 may be punched on the slide 102 and be convex on the inner surface 137 of the slide 102, while concave on an outer surface (the outer surface being visible in FIG. 4 and the inner surface 137 being visible in FIG. 5). In an aspect, the dimples 150, 152 may be formed only on one side wall 138. In another aspect, dimples 150, 152 may be formed on both side walls 138.

The dimples 150, 152 are spaced apart along the longitudinal axis 116 (shown in FIG. 1) and positioned below the transverse opening 142. As such, the dimples 150, 152 reduce or prevent the truck assembly 104 from unintentionally dropping from its retracted position and the bottom end 129 of the support plate 132 from moving over the dimples 150, 152. When the truck assembly 104 is in the retracted position, the dimples 150, 152 engage with the bottom end 129 of the support plate 132 and the end of the support plate 132 that is positioned closest to the opening 127 of the housing 106.

Additionally, unintentional rotation of the truck assembly 104 in the retracted position is reduced or prevented as the dimples 150, 152 are positioned on opposite sides of the pin 146. For example, the dimple 150 is disposed on a first side 154 of the transverse opening 142, while the dimple 152 is disposed on an opposite second side 156, the sides 154, 156 of the transverse opening 142 defined with respect to the longitudinal axis 116. Because the dimples 150, 152 are positioned on both sides 154, 156 of the transverse opening 142, the truck assembly 104 pivoting around both directions of the pin 146 is restricted. In an aspect, the dimples 150, 152 are not positioned directly below the transverse opening 142 or the pin 146 in the direction of the transverse axis 125.

The dimples 150, 152, however, do not prohibit all extension movement of the truck assembly 104. Using the adjustment fastener 148 still enables the slide 102 to slide within the housing 106 and move the support plate 132 over the dimples 150, 152 so as to extend the rollers 126, 128 as required or desired. In an aspect, disengagement of the dimples 150, 152 from the bottom end 129 of the support plate 132 does not add a significant amount of rotational torque at the adjustment fastener 148. As such, the dimples 150, 152 do not inhibit all movement of the truck assembly 104 within the slide 102. Rather, only unintentional dropping and rotation of the truck assembly 104 is reduced or prevented.

In an example, at least a portion of one or more of the dimples 150, 152 may positioned at least partially above the rollers 126, 128 when viewed from the side and as illustrated in FIG. 4 and when the truck assembly 104 is in the retracted position. In other examples, the dimples 150, 152 may be positioned inward from the rollers 126, 128 and not be positioned over when the truck assembly 104 is in the retracted position. In another example, an extension distance 158 of the dimples 150, 152 (e.g., the protrusion distances from the inner surface 137 of the side wall 138) is less than the extension distance 135 (shown in FIG. 3) of the protrusion 144 of the slide 102. As such, the dimples 150, 152 do not prevent all movement of the truck assembly 104 with respect to the slide 102, and the truck assembly 104 may still slide past the dimples 150, 152 (e.g., via the adjustment fastener 148) as required or desired.

In an aspect, the dimples 150, 152 have a curved dome-like shape so as to allow the support plate 132 to slide past when desired. In an aspect, both of the dimples 150, 152 may have the same shape and size. In other examples, the dimples 150, 152 may have different shapes and/or sizes as required or desired. The dimples 150, 152 have substantially smooth curved surfaces so that the truck assembly 104 may still slide relative to the slide 102 and in both directions (e.g., both extension and retraction directions of the truck assembly 104). In contrast, features such as punched flanges or hooks may not enable the truck assembly 104 to still slide within the slide 102 as required for operation of the sliding door roller 100 as described herein.

In the example, the slide 102 is the only component including the dimples 150, 152 for engaging with the truck assembly 104. The truck assembly 104 does not include any dimples.

Figure 6:
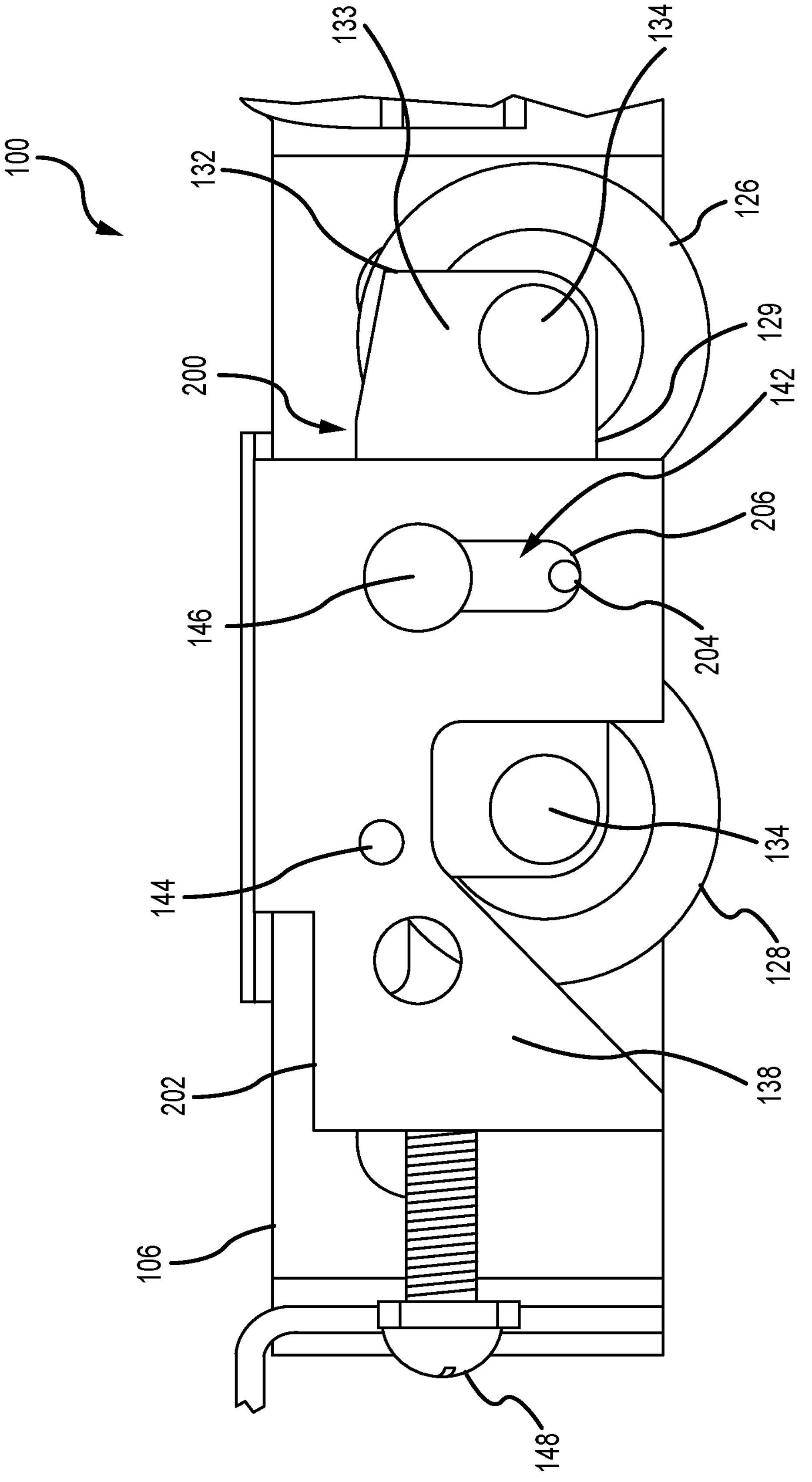
FIG. 6 is a side interior view of the sliding door roller with another exemplary slide and truck assembly that reduces or prevents drop and rotation of the truck assembly.

FIG. 6 is a side interior view of the sliding door roller 100 with another exemplary truck assembly 200 and slide 202 configuration that reduces or prevents drop and rotation of the truck assembly 200. Certain components are described above and are not necessarily described further. In this example, the truck assembly 200 includes a single detent dimple 204 disposed on one or both of the support plates 130, 132. In an aspect, the dimple 204 is disposed only on one support plate 132. In other aspect, the dimple 204 may be disposed on both support plates 130, 132. The dimple 204 is disposed on the outer surface 133 of the support plate 132 and is configured to engage with the transverse opening 142 of the side wall 138 (e.g., one or both of the side walls 138) of the slide 202 when the truck assembly 200 is in its most retracted position as illustrated. In an example, the dimple 204 may be punched on the support plate 132 and be convex on the outer surface 133, while concave on the inner surface.

The dimple 204 is spaced apart and aligned below the pin 146 on the truck assembly 200 along a direction corresponding to the transverse axis 125 (shown in FIG. 1). The dimple 204 is configured to engage with a perimeter edge of the transverse opening 142. More specifically, a bottom edge 206 of the transverse opening 142 positioned closest to the bottom of the housing 106. As such, the dimple 204 reduces or prevents the truck assembly 200 from unintentionally dropping from its retracted position and the dimple 204 from sliding under the side wall 138 of the slide 202. Additionally, unintentional rotation of the truck assembly 200 in the retracted position is reduced or prevented as the dimple 204 and the pin 146 are positioned on opposite ends of the transverse opening 142. As such, rotation of the truck assembly 200 is reduced or restricted relative to the slide 202.

Similar to the example described above, using the adjustment fastener 148 still enables the slide 202 to slide within the housing 106 and move the dimple 204 under the slide 202 so as to extend the rollers 126, 128 as required or desired. In an aspect, disengagement of the dimple 204 from the transverse opening 142 does not add a significant amount of rotational torque at the adjustment fastener 148. As such, the dimple 204 dose not inhibit all movement of the truck assembly 200 within the slide 202. Rather, only unintentional dropping and rotation of the truck assembly 200 is reduced or prevented.

In an example, at least a portion of the dimple 204 may be positioned between the axles 134 when viewed from the side as in FIG. 6. In other examples, the dimple 204 may be positioned between the rollers 126, 128. In another example, an extension distance of the dimple 204 (e.g., the protrusion distances from the outer surface 133 of the support plate 132) is less than the extension distance 135 (shown in FIG. 3) of the protrusion 144 of the slide 202. As such, the dimple 204 does not prevent all movement of the truck assembly 200 with respect to the slide 202, and the dimple 204 may still slide past the slide 202 (e.g., via the adjustment fastener 148) as required or desired. In an aspect, the dimple 204 has a curved dome-like shape so as to allow the side wall 138 to slide past when desired. The dimple 204 has substantially smooth curved surfaces so that the truck assembly 200 may still slide relative to the slide 202 and in both directions (e.g., both extension and retraction directions of the truck assembly 200). In contrast, features such as punched flanges or hooks may not enable the truck assembly 200 to still slide within the slide 202 as required for operation of the sliding door roller 100.

In this example, the ends (e.g., top and bottom 206) of the transverse opening 142 are curved and the dimple 204 is positioned at the apex of the curve for engagement in the retracted position. In other examples, two dimples may be positioned on both sides of the transverse opening 142 and at the transition between the parallel sides and the curved portion. In still other examples, the dimple 204 may have other shapes and sizes, for example, square, triangle, elongated lines, or a shape that corresponds to at least a portion of the perimeter of the transverse opening 142. The dimple 204 may be positioned directly below the pin 146. In this example, the slide 202 does not include any dimples for engaging with the truck assembly 200. Rather, it is the truck assembly 200 that only includes the dimple 204. The dimple 204 is positioned proximate the bottom end 129 of the support plate 132.

Figure 7:
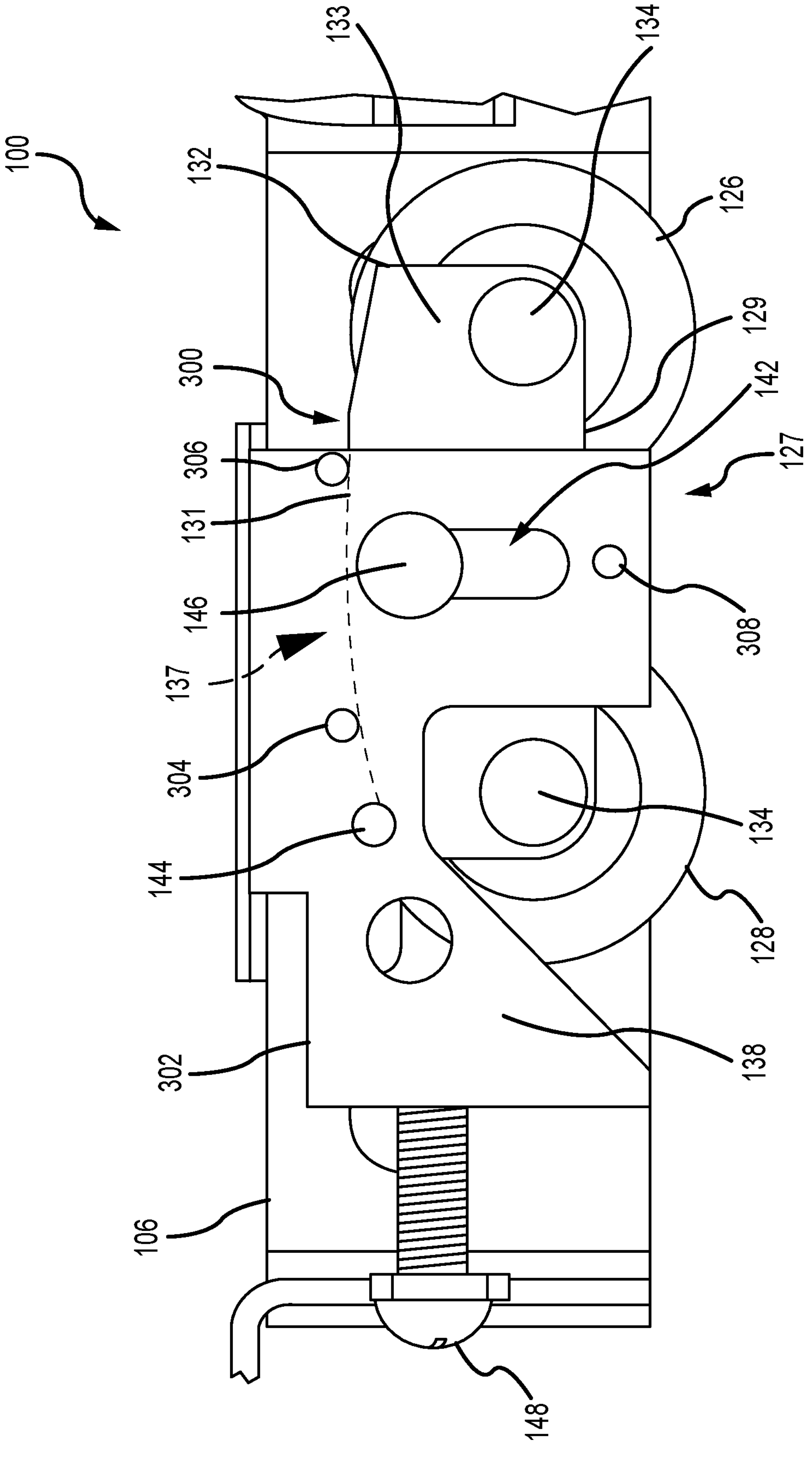
FIG. 7 is a side interior view of the sliding door roller with another exemplary slide and truck assembly that reduces or prevents drop and rotation of the truck assembly.

FIG. 7 is a side interior view of the sliding door roller 100 with another exemplary truck assembly 300 and slide 302 that reduces or prevents drop and rotation of the truck assembly 300. Certain components are described above and are not necessarily described further. In this example, the slide 302 includes a pair of detent dimples 304, 306 disposed on one or both of the side walls 138. In an example, the dimples 304, 306 are disposed on both side walls 138 of the slide 302. In another example, the dimples 304, 306 are disposed on only one side wall 138. The dimples 304, 306 are disposed on the inner surface 137 of the side wall 138 and are configured to engage with the top end 131 of the support plate 132 (e.g., one or both of the support plates 130, 132) of the truck assembly 300, when the truck assembly 300 is in its most retracted position as illustrated. The top end 131 is the end of the support plates that is positioned farthest from the opening 127 of the housing 106. In an example, the dimples 304, 306 may be punched on the slide 302 and be convex on the inner surface 137, while concave on the outer surface.

The dimples 304, 306 are spaced apart along the longitudinal axis 116 (shown in FIG. 1) and positioned above the transverse opening 142. In the example, the dimples 304, 306 are disposed on the first and second sides of the transverse opening 142. As such, the dimples 304, 306 reduce or prevent the truck assembly 300 from unintentionally rotating relative to the pin 146 in the retracted position as the dimples 304, 306 are positioned on opposite sides of the pin 146. In this example, however, these dimples 304, 306 alone would not hold the truck assembly 300 vertically within the slide 302 in the retracted position because they are disposed above the truck assembly 300. As such, additionally, another third dimple 308 below the transverse opening 142 may be used to reduce or prevent dropping of the truck assembly 300. In this example, the adjustment fastener 148 still enables the slide 302 to slide within the housing 106 and move the support plate 132 over the dimple 308 so as to extend the rollers 126, 128 as required or desired. By using a single dimple 308, the engagement force between the truck assembly 300 and the slide 302 may be reduced as compared with using multiple dimples for still retaining the truck assembly 300 but reducing the torque needed from the adjustment fastener 148.

The dimple 308, similar to the dimples 150, 152 shown in FIGS. 4 and 5, is disposed on one or both of the side walls 138 of the slide 302. The dimple 308 is configured to retain the truck assembly 300 in the retracted position and so as to restrict or prevent the truck assembly 300 from dropping out of the opening 127 of the housing 106. The dimple 308 is disposed on the inner surface 137 of the side wall 138 and is configured to engage with the bottom end 129 of the support plate (e.g., one or both of the support plates 130, 132) of the truck assembly 300. In an aspect, the dimple 308 may be formed only on one side wall 138. In another aspect, the dimple 308 may be formed on both side walls 138. The dimple 308 is spaced apart and aligned below the pin 146 along a direction corresponding to the transverse axis 125 (shown in FIG. 1).

In this example, the combination of the three dimples 304, 306, 308 work together to restrict or prevent rotation and drop of the truck assembly 300, with the dimples 304, 306 restricting rotation and the dimple 308 restricting drop when the truck assembly 300 is in the retracted position. It is appreciated that in some examples, the dimples 304, 306 may be used independently from the dimple 308 so that only rotation or only drop is restricted. While the third dimple 308 is a single dimple, in other examples, more than one lower dimple may be used as required or desired.

Figure 8:
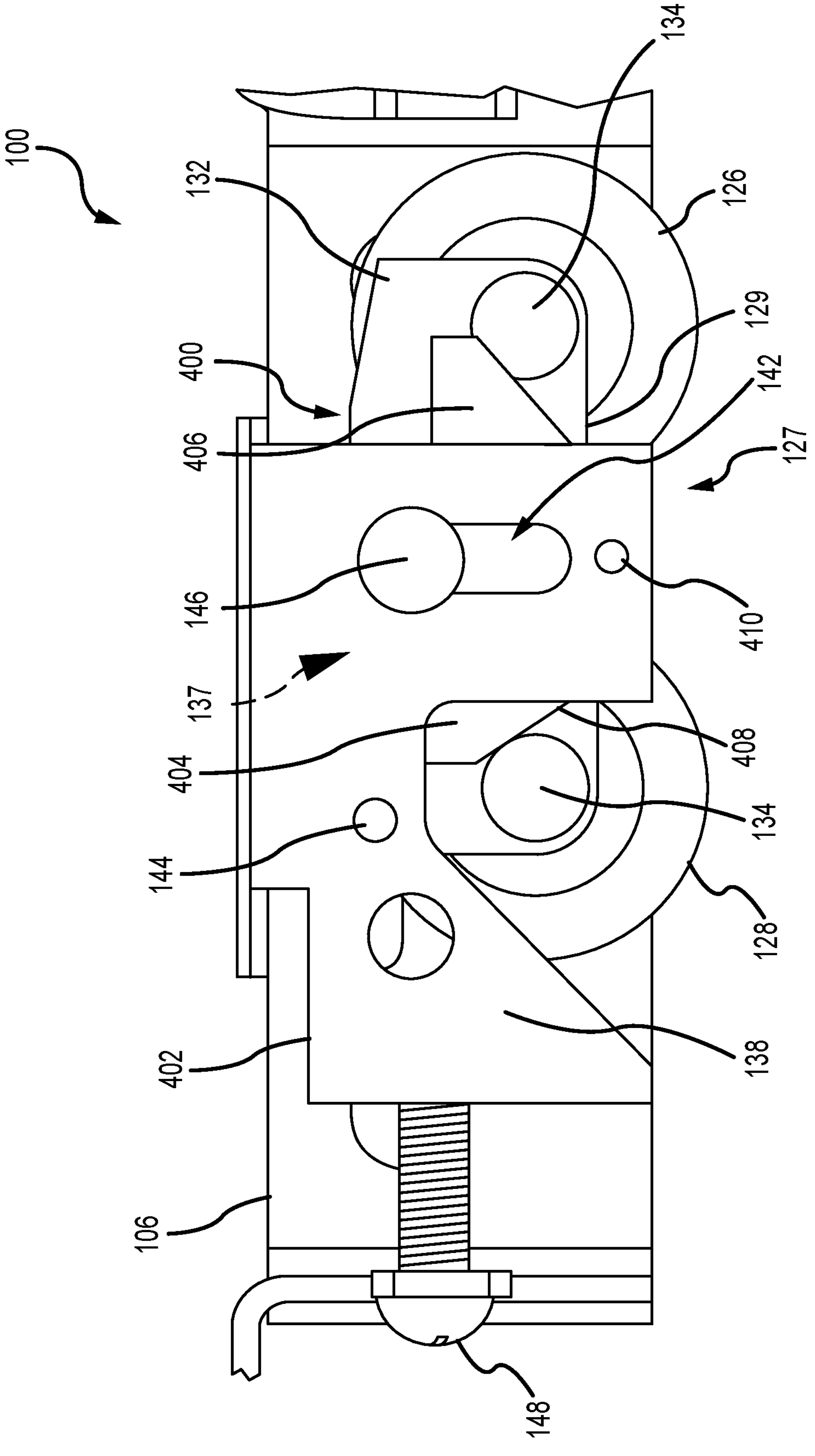
FIG. 8 is a side interior view of the sliding door roller with another exemplary slide and truck assembly that reduces or prevents drop and rotation of the truck assembly.

FIG. 8 is a side interior view of the sliding door roller 100 with another exemplary truck assembly 400 and slide 402 that reduces or prevents drop and rotation of the truck assembly 400. Certain components are described above and are not necessarily described further. In this example, the slide 402 includes a pair of wing extensions 404, 406 formed on one or both of the side walls 138. In an example, the wing extensions 404, 406 are formed on both of the side walls 138 of the slide 402. In another example, the wing extensions 404, 406 are only on one of the side walls 138. The wing extensions 404, 406 are disposed planar with the side wall 138 and are configured to engage with the axle 134 adjacent one or both of the support plates 130, 132 of the truck assembly 400 when the truck assembly 104 is in its most retracted position as illustrated. In an example, the wing extensions 404, 406 may be integral on the slide 402 or a component that is connected thereto with an oblique side 408 that engages with the axles 134. As such, when the truck assembly 400 is extended, rotation about the pin 146 is still enabled. In an example, one of the wing extensions 404 is disposed within the cutout 139 of the slide 402.

The wing extensions 404, 406 are spaced apart along the longitudinal axis 116 (shown in FIG. 1) and positioned to either side of the transverse opening 142. In the example, the wing extensions 404, 406 are longitudinally aligned with the transverse opening 142. As such, the wing extensions 404, 406 reduce or prevent the truck assembly 400 from unintentionally rotating relative to the pin 146 in the retracted position as the wing extensions 404, 406 are positioned on opposite sides of the pin 146 and against the axles 134. In this example, and similar to the dimples 304, 306 (shown in FIG. 7), these wing extensions 404, 406 alone would not hold the truck assembly 400 vertically within the slide 402. As such, additionally, a single dimple 410 below the transverse opening 142 may be used to reduce or prevent dropping of the truck assembly 400. In this example, the adjustment fastener 148 still enables the slide 402 to slide within the housing 106 and move the support plate 132 so as to extend the rollers 126, 128 as required or desired.

The dimple 410, similar to the dimple 308 shown in FIG. 7, is disposed on one or both of the side walls 138 of the slide 402. The dimple 410 is configured to retain the truck assembly 400 in the retracted position and so as to restrict or prevent the truck assembly 400 from dropping out of the opening 127 of the housing 106. The dimple 410 is disposed on the inner surface 137 of the side wall 138 and is configured to engage with the bottom end 129 of the support plate (e.g., one or both of the support plates 130, 132) of the truck assembly 400. In an aspect, the dimple 410 may be formed only on one side wall 138. In another aspect, the dimple 410 may be formed on both side walls 138. The dimple 410 is spaced apart and aligned below the pin 146 along a direction corresponding to the transverse axis 125 (shown in FIG. 1).

It is appreciated that in some examples, the wing extensions 404, 406 may be used independently from the dimple 410 so that only rotation or only drop is restricted. While the dimple 410 is a single dimple, in other examples, more than one lower dimple may be used as required or desired.

The materials utilized in the manufacture of the sliding door rollers described herein may be those typically utilized for door hardware, e.g., zinc, steel, aluminum, brass, stainless steel, etc. Molded plastics, such as PVC, polyethylene, etc., may be utilized for the various components. Material selection for most of the components may be based on the proposed use of the sliding door rollers. Appropriate materials may be selected for components used on particularly heavy panels, as well as on components subject to certain environmental conditions (e.g., moisture, corrosive atmospheres, etc.).

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A sliding door roller comprising:

a housing defining a longitudinal axis and a transverse axis, the longitudinal axis orthogonal to the transverse axis, the housing defining an opening oriented substantially along the transverse axis;

a slide defining a transverse opening enlarged along a direction corresponding to the transverse axis and slidably disposed within the housing, the slide selectively moveable along the longitudinal axis, the slide having a first surface;

an adjustment fastener parallel to the longitudinal axis and coupled between the slide and the housing, the adjustment fastener configured to selectively move the slide along the longitudinal axis;

a truck assembly disposed at least partially within the slide, the truck assembly comprising:

at least one support plate having a second surface;

at least one roller rotatably coupled to the at least one support plate; and a pin coupled to the housing and the slide at the transverse opening, wherein the truck assembly is selectively rotatable about the pin relative to the slide and selectively slidable within the transverse opening; and one or more detent dimples extending from the first surface or the second surface, wherein the truck assembly is moveable via the adjustment fastener and the slide between at least a retracted position and an extended position with respect to the opening of the housing, and wherein in the retracted position, the truck assembly is retained via the one or more detent dimples such that the truck assembly is restricted from dropping out of the opening of the housing along the transverse axis.

2. The sliding door roller of claim 1, wherein in the retracted position, the truck assembly is retained via the one or more detent dimples such that the truck assembly is restricted from rotating about the pin.

3. The sliding door roller of claim 1, wherein the one or more detent dimples includes a first dimple and a second dimple, the first dimple disposed on a first side of the transverse opening and the second dimple disposed on a second side of the transverse opening, the first and second sides defined with respect to the longitudinal axis.

4. The sliding door roller of claim 3, wherein the first and second dimples extend from the first surface.

5. The sliding door roller of claim 3, wherein when the truck assembly is in the retracted position, the first and second dimples engage with an end of the at least one support plate positioned closest to the opening of the housing.

6. The sliding door roller of claim 3, wherein when the truck assembly is in the retracted position, the first and second dimples engage with an end of the at least one support plate positioned farthest from the opening of the housing.

7. The sliding door roller of claim 1, wherein the one or more detent dimples are a single dimple aligned with the pin along a direction corresponding to the transverse axis.

8. The sliding door roller of claim 7, wherein the single dimple extends from the second surface, and wherein when the truck assembly is in the retracted position, the single dimple engages with an end edge of the transverse opening.

9. The sliding door roller of claim 7, wherein the single dimple extends from the first surface, and wherein when the truck assembly is in the retracted position, the single dimple engages with an end of the at least one support plate positioned closest to the opening of the housing.

10. The sliding door roller of claim 9, wherein the slide includes a pair of wing extensions, and wherein when the truck assembly is in the retracted position, the pair of wing extensions engages with the truck assembly.

11. The sliding door roller of claim 1, wherein the slide includes a protrusion having a first extension distance, the one or more detent dimples having a second extension distance, the first extension distance greater than the second extension distance.

12. A sliding door roller comprising:

a housing defining a longitudinal axis;

a slide disposed within the housing and selectively slidable along the longitudinal axis, wherein the slide defines a transverse opening;

an adjustment fastener coupled between the slide and the housing, the adjustment fastener configured to selectively move the slide along the longitudinal axis; and a truck assembly disposed at least partially within the slide and at least partially slidable and rotatable with respect to the slide, the truck assembly comprising:

a pair of support plates;

a pair of rollers rotatably coupled between the pair of support plates; and a pin slidably engaged with both the housing and the slide at the transverse opening, the pin defining a rotation axis for the truck assembly, wherein the truck assembly is moveable between at least a retracted position and an extended position with respect to the housing via the adjustment fastener and the slide, and wherein in the retracted position, the truck assembly is releasably engaged with the slide such that the truck assembly is restricted from dropping out of the housing and rotating therein.

13. The sliding door roller of claim 12, further including a pair of dimples extending from an inner surface of the slide that engage with the truck assembly when in the retracted position.

14. The sliding door roller of claim 13, wherein the pair of dimples are disposed on opposite sides of the transverse opening relative to the longitudinal axis.

15. The sliding door roller of claim 12, further including a dimple extending from an outer surface of one or more of the pair of support plates that engages with an end of the transverse opening when the truck assembly is in the retracted position.

16. The sliding door roller of claim 12, further including a pair of dimples extending from an inner surface of the slide to engage with a curved top edge of the truck assembly when in the retracted position.

17. The sliding door roller of claim 16, further including a single dimple extending from the inner surface of the slide to engage with a straight bottom edge of the truck assembly when in the retracted position.

18. The sliding door roller of claim 12, wherein the slide includes a pair of opposing extensions configured to engage with axles of the truck assembly when in the retracted position.

19. The sliding door roller of claim 18, wherein a dimple extends from an inner surface of the slide that engages with the truck assembly when in the retracted position.

20. A sliding door roller comprising:

a housing defining a longitudinal axis and a transverse axis, the longitudinal axis orthogonal to the transverse axis, the housing defining an opening oriented substantially along the transverse axis;

a slide defining a transverse opening enlarged along a direction corresponding to the transverse axis and slidably disposed within the housing, the slide having a first surface;

an adjustment fastener coupled between the slide and the housing, the adjustment fastener configured to selectively move the slide along the longitudinal axis;

a truck assembly disposed within the slide, the truck assembly comprising:

at least one support plate having a second surface;

at least one roller rotatably coupled to the at least one support plate; and a pin coupled to the housing and the slide at the transverse opening, wherein the truck assembly is selectively rotatable about the pin relative to the slide and selectively slidable within the transverse opening; and one or more detent dimples extending from the first surface or the second surface, wherein the truck assembly is moveable via the slide between at least a retracted position and an extended position with respect to the opening of the housing, and wherein in the retracted position, the truck assembly is retained via the one or more detent dimples such that the truck assembly is restricted from dropping out of the opening of the housing along the transverse axis and is restricted from rotating about the pin.

* * * * *